(12) United States Patent
Kilkenny

(10) Patent No.: US 6,588,713 B2
(45) Date of Patent: Jul. 8, 2003

(54) ANCHOR ASSEMBLY FOR ELECTRIFIED CONDUCTOR BAR

(75) Inventor: Stephen W. Kilkenny, Menomonee Falls, WI (US)

(73) Assignee: MagneTek, Inc., Milwaukee, WI (US)

(*) Notice: Subject to any disclaimer, the term of this patent is extended or adjusted under 35 U.S.C. 154(b) by 0 days.

(21) Appl. No.: 10/197,200

(22) Filed: Jul. 17, 2002

(65) Prior Publication Data

US 2003/0025047 A1 Feb. 6, 2003

Related U.S. Application Data

(60) Provisional application No. 60/309,385, filed on Aug. 1, 2001.

(51) Int. Cl.$^7$ .................................................. F16L 3/08

(52) U.S. Cl. .......................................... 248/65; 248/58

(58) Field of Search ........................... 248/65, 67, 67.7, 248/58, 61, 63, 62, 49; 339/244, 21, 14; 439/781

(56) References Cited

U.S. PATENT DOCUMENTS

| | | | | | |
|---|---|---|---|---|---|
| 2,466,247 | A | * | 4/1949 | Land | 248/62 |
| 3,051,424 | A | * | 8/1962 | Duhamel | 248/62 |
| 3,339,174 | A | | 8/1967 | Walter et al. | 339/244 |
| 3,652,045 | A | * | 3/1972 | Hirt | 248/62 |
| 3,836,936 | A | | 9/1974 | Clement | 339/21 |
| 4,201,433 | A | | 5/1980 | Caldwell | 339/14 |
| 4,764,131 | A | | 8/1988 | Beinhaur | 439/781 |
| 5,924,655 | A | * | 7/1999 | Rinderer | 248/55 |
| 5,934,818 | A | | 8/1999 | Schmitt et al. | 403/399 |

* cited by examiner

Primary Examiner—Ramon O. Ramirez
(74) Attorney, Agent, or Firm—Waddey & patterson, P.C.; Mark J. Patterson; Phillip E. walker

(57) ABSTRACT

The present invention provides an assembly for attaching a high current conductive line to a support. The assembly comprises a first interlocking member shaped to receive the conductive line and a second interlocking member removably attached to the first interlocking member and shaped to receive the conductive line. Engagement between the first interlocking member and the second interlocking member defines a retaining aperture shaped to retain the conductive line.

15 Claims, 6 Drawing Sheets

ANCHOR ASSEMBLY FOR ELECTRIFIED CONDUCTOR BAR

This application claims priority to Provisional Patent Application No. 60/309,385 filed on Aug. 1, 2001 and whose contents is expressly incorporated herein by reference.

Be it known that I, Stephen W. Kilkenny, residing in Milwaukee, Wis., have invented a new and useful "ANCHOR ASSEMBLY FOR ELECTRIFIED CONDUCTOR BAR".

BACKGROUND OF THE INVENTION

The present invention relates generally to an assembly for attaching a high current conductive line to a support.

DESCRIPTION OF THE PRIOR ART

The current invention is an assembly designed to removably engage a high current conductive line. The design of the current invention allows the user of the assembly to have numerous options for the location of the assembly along a support in order to secure the high conductive line to the support. The assembly allows a slideable attachment of two sections of the invention with the conductive line and mounting hardware used to secure the device and the conductive line to the support.

There exists contemporary attachment devices used to attach high conductive lines, or bus bars, to supports. However, these prior art devices have several inadequacies. For example, these prior art devices are not easily removed and attached to the high conductive line. Also, these prior art devices usually require the device to fit over one end of the conductive line before moving the prior art device to the desired location. As such, a user of a prior art device lacks the option of easily attaching the prior art device to an intermediate location along the length of the conductive line. This causes additional time and effort during installation, removal, or replacement of the prior art devices. This additional time and effort increases cost and difficulties associated with mounting high current conductive lines.

Another cost saving advantage of the current invention is that the assembly is comprised of two identical sections. This configuration allows a single manufacturing process to create the separate sections of the assembly, therefore reducing the construction cost of the assembly. This design also creates less confusion when a user is assembling the device.

The design of the current invention allows the assembly to not only support the high current conductive line, but also restrict expansion and movement of the conductive line. This restricted expansion and movement improves the securement of the high current conductive bar to the support.

Due to the lack of adequate devices for attaching high conductive lines to supports, there is a need in the art for an assembly adapted to removably engage high conductive electrical lines to a support in an efficient manner.

SUMMARY OF THE INVENTION

The present invention provides an assembly for attaching a high current conductive line to a support. The assembly comprises a first interlocking member shaped to receive the conductive line and a second interlocking member removably attached to the first interlocking member and shaped to receive the conductive line. Engagement between the first interlocking member and the second interlocking member defines a retaining aperture shaped to retain the conductive line.

The first interlocking member includes at least one connection arm and a second interlocking member includes at least one receiving portion shaped to accept the connection arm. Engagement between the connection arm and the receiving portion removably engages the first interlocking member to the second interlocking member. A locking element engages the connection arm and removably attaches the first interlocking member to the second interlocking member.

It is a general object of the present invention to provide an assembly for attaching a high current conductive line to a support.

Another object of the present invention is to provide a removably attaching assembly for retaining a high current conductive line near a support.

Still another object of this invention is to provide a device that slideably engages a high current conductive line to retain the high current conductive line near a support.

Still another object of the present invention is to spatially confine a bus bar in order to retain the bus bar near a support.

Still another object of the present invention is to provide an assembly designed to frictionally retain a high current conductive line near a support.

Numerous other objects, features and advantages of the present invention will be readily apparent to those skilled in the art, upon a reading of the following disclosure, when taken in conjunction with the accompanying drawings.

BRIEF DESCRIPTION OF THE DRAWINGS

FIG. 3 shows the assembly retaining the bus bar. FIG. 3 does not show the assembly engaging the support.

DESCRIPTION OF THE PREFERRED EMBODIMENTS

Figure 1:
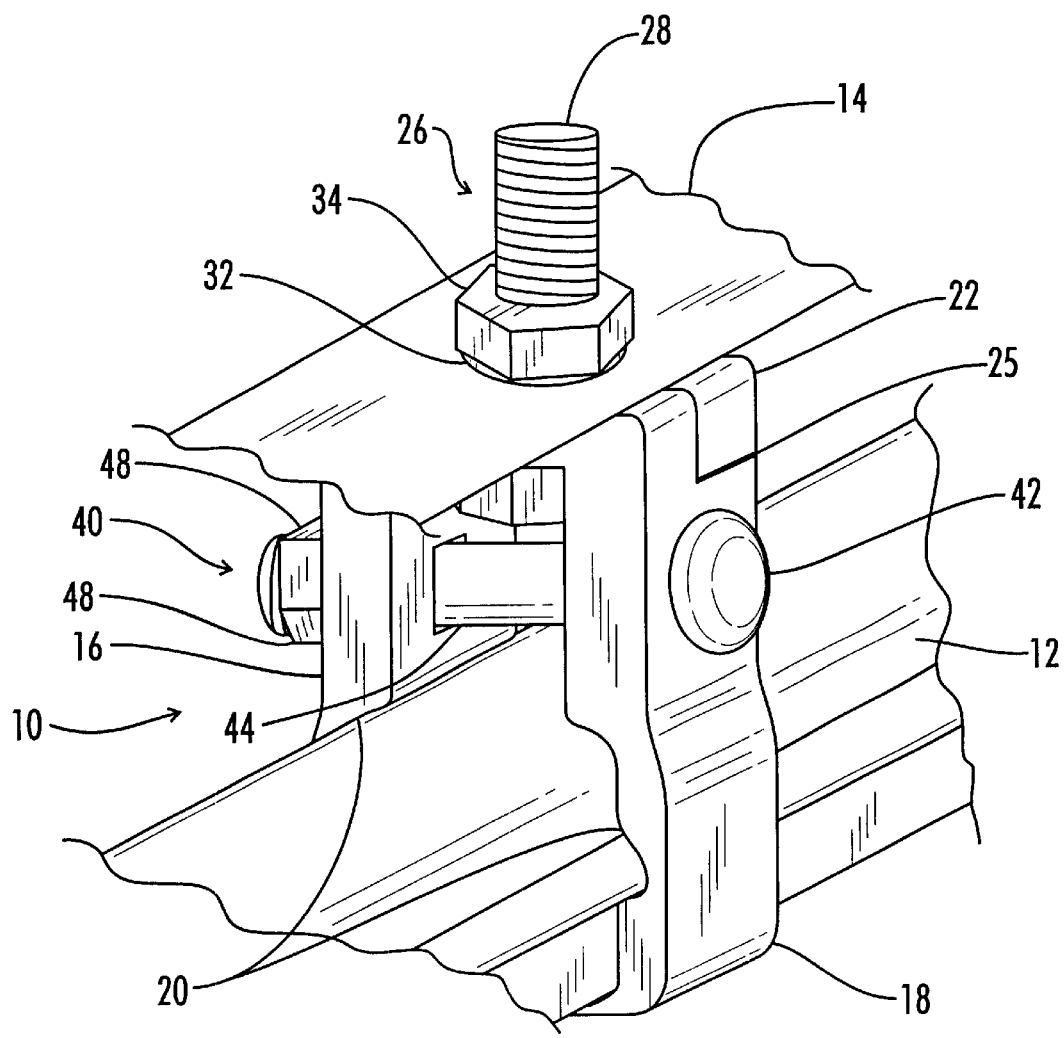
FIG. 1 is a perspective view of the assembly shown retaining the conductive line and engaging the support.
Figure 3:
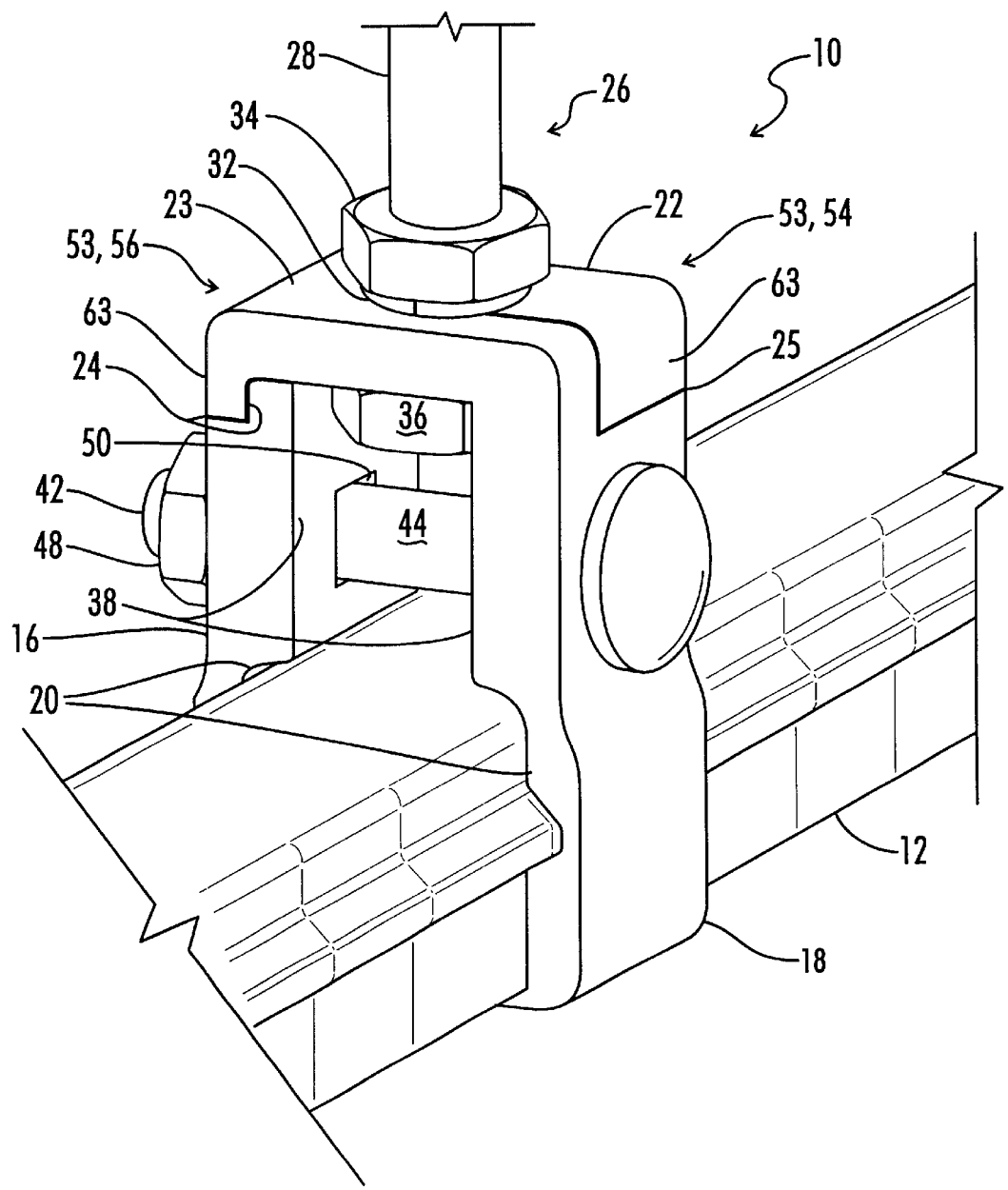
FIG. 3 is a perspective view similar to FIG. 1.
Figure 4:
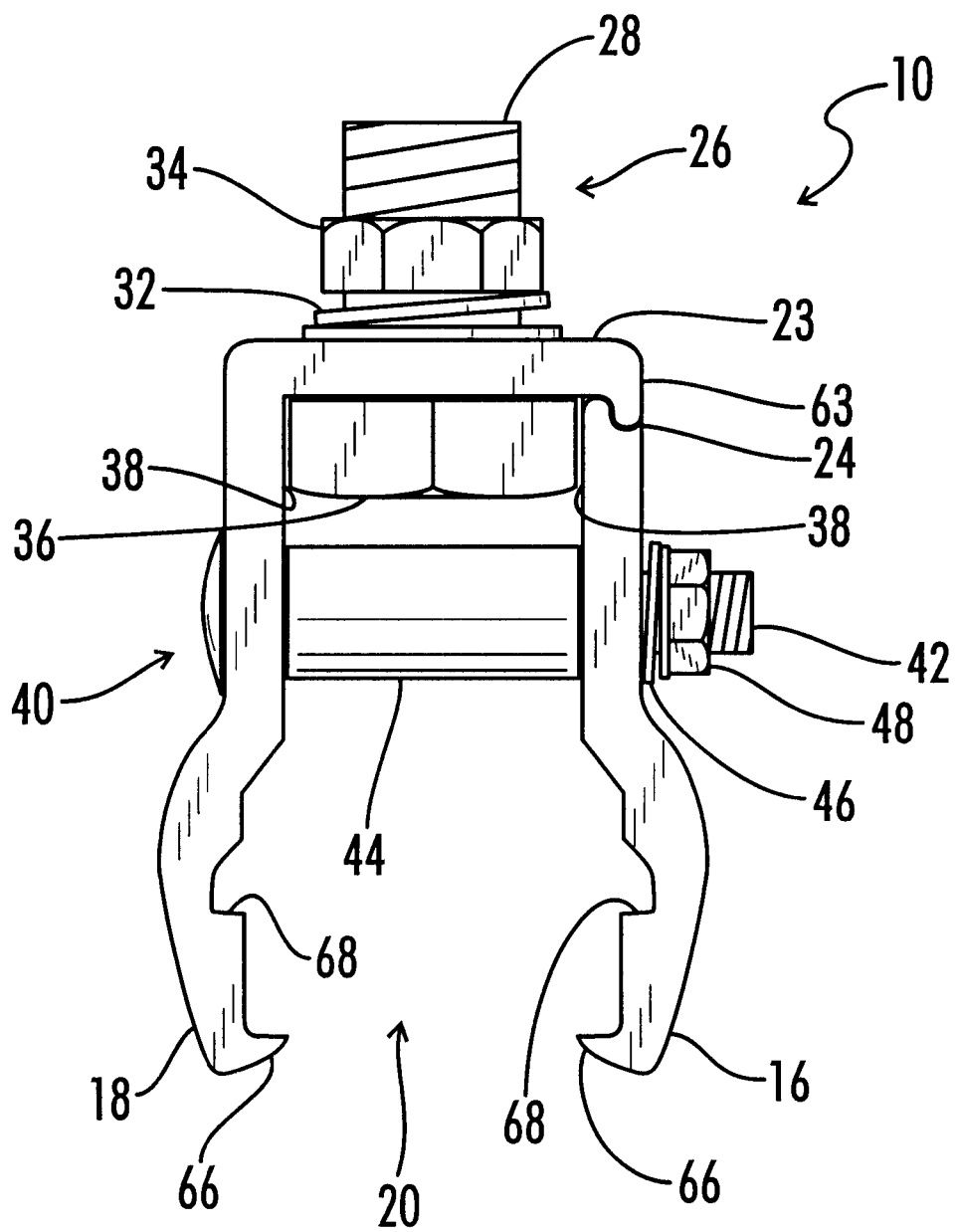
FIG. 4 shows a front view of the assembly.
Figure 6:
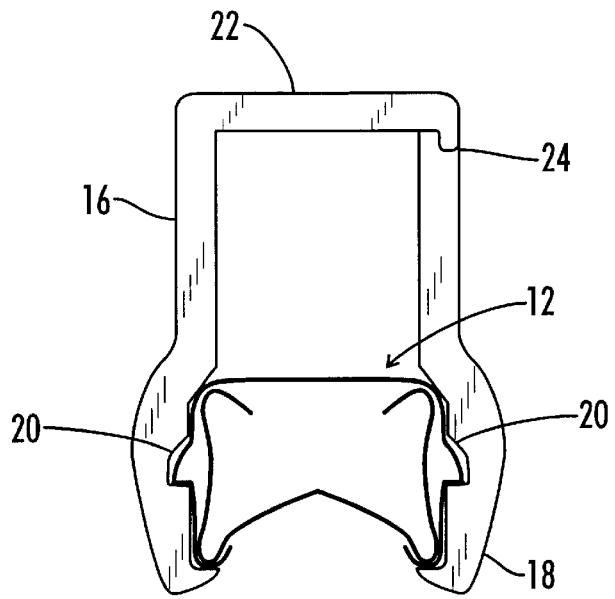
FIG. 6 is similar to FIG. 5 except that FIG. 6 shows the assembly slideably attached to the conductive line.

Referring now to FIG. 1, the assembly of the present invention is shown and generally designated by the numeral 10. The assembly 10, also known as a device 10, of the current invention is designed to attach a high current conductive line 12, also known as a bus bar 12, to a support 14. The assembly 10 comprises a first interlocking member 16 shaped to receive the conductive line 12 and a second interlocking member 18 removably attached to the first interlocking member 16. The second interlocking member 18 is also shaped to receive the conductive line 12, whereby engagement between the first interlocking member 16 and the second interlocking member 18 defines a retaining aperture 20 shaped to retain the conductive line 12. The retaining aperture 20 is best seen in FIG. 4. In a preferred embodiment, the retaining aperture 20 of the assembly 10 conforms to the shape of the conductive line 12, as seen in FIGS. 1, 3, and 6.

Figure 2:
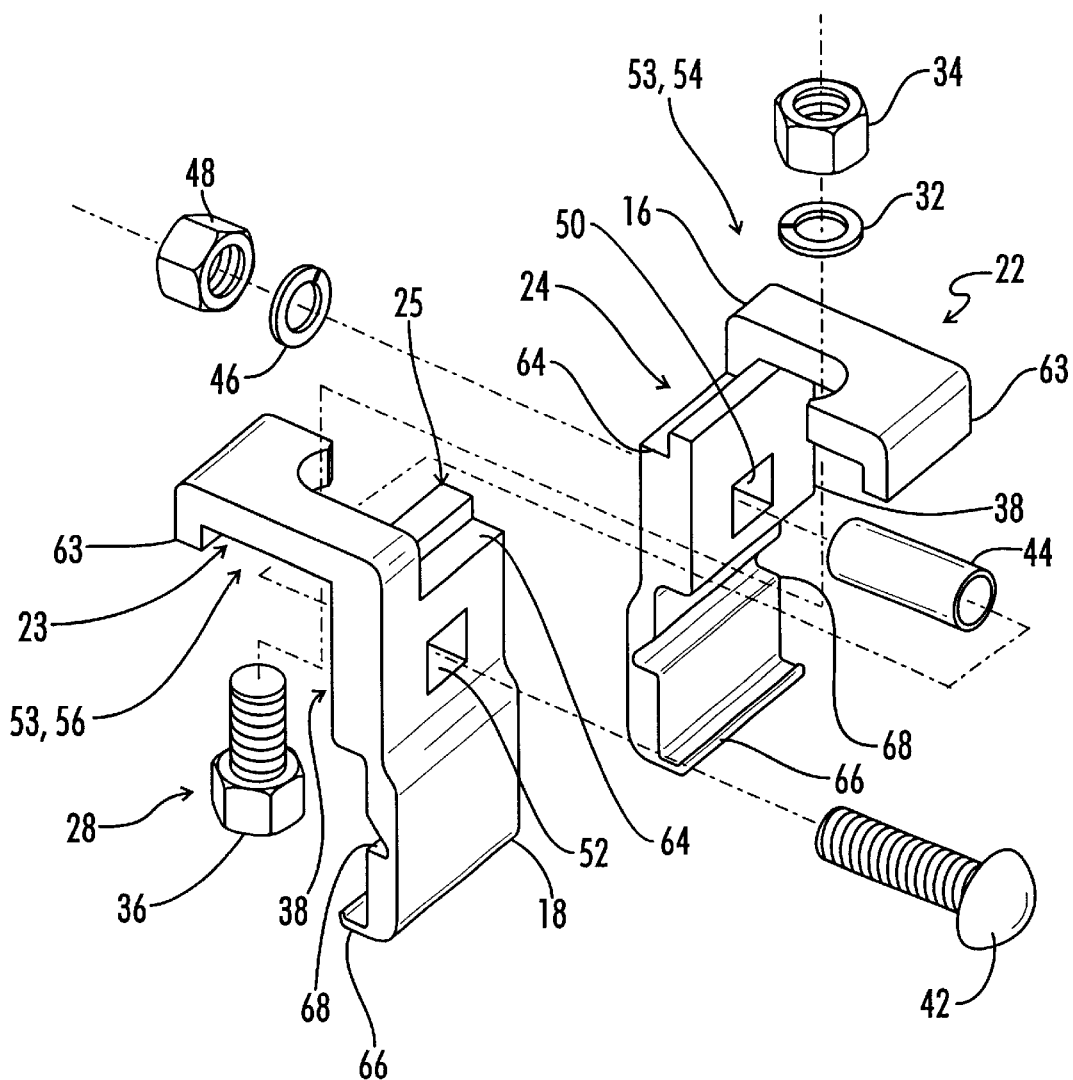
FIG. 2 is an exploded view of the assembly showing the relationship between the components of the device.

In a preferred embodiment shown in FIG. 2, the first interlocking member 16 and the second interlocking member 18 include retaining extensions 66 and 68 designed to engage the conductive line 12 and to further facilitate the retention of the conductive line 12 within the assembly 10. The retaining extensions 66 and 68 are portions of the assembly 10 that further conform to the shape of the conductive line 12 to retain the conductive line 12 within the assembly 10.

The retaining extensions 66 and 68 comprise part of the retaining aperture 20 and are formed as part of the first interlocking member 16 and the second interlocking member 18. The retaining extensions 66 and 68 are flat surfaces that extend perpendicular from the first interlocking member 16 and the second interlocking member 18 to engage and support the conductive line 12. In this embodiment the retaining extensions 66 and 68 extend toward each other within the retaining aperture 20.

The first interlocking member 16 contains at least one connection arm 22, which can also be called a first connection arm 22 or a first protrusion 22. The second interlocking member 18 includes at least one receiving portion 25, which can also be called a second receiving protrusion 25, shaped to accept the first connection arm 22. Engagement between the first connection arm 22 and the at least one receiving portion 25 removably engages the first interlocking member 16 to the second interlocking member 18.

In an alternate embodiment, the second interlocking member 18 includes a second connection arm 23 and the first interlocking number 16 includes a first receiving portion 24. The assembly 10 is designed so that the first connection arm 22 engages the second receiving portion 25 concurrently with the engagement of the second connection arm 23 and the first receiving portion 24. This concurrent engagement facilitates the attachment between the first interlocking member 16 and the second interlocking member 18.

The first connection arm 22 is located opposite from the portion of the first interlocking member 16 that is shaped to receive the conductive line 12, while the second connection arm 23 is located opposite from the portion of the second interlocking member 18 that is shaped to receive the conductive line 12. This placement facilitates connection between the assembly 10, the support 14, and the conductive line 12.

The device 10 further comprises a locking element 26 engaging the at least one connection arm 22 and removably attaching the first interlocking member 16 to the second interlocking member 18. The locking element 26 can also removably engage the first interlocking member 16, the second interlocking member 18 and the support 14. When engaging all three elements, the locking element 26 removably attaches the first interlocking member 16 and the second interlocking member 18 to the support 14.

The fact that the first interlocking member 16 and the second interlocking member 18 can slideably engage and the conductive line 12 provides a user of the device 10 options in the implementation of the device 10. For example, the device 10 can removably engage an intermediary portion of the bus bar 12 without having to insert the device 10 on one end of the bus bar 12 and then move the device 10 to the desired location for support. The ability of the device 10 to be positioned at any desired location along the length of the bus bar 12 allows the user of the device 10 to have numerous options in deciding where to use the device 10 to attach the bus bar 12 to a support 14.

Figure 5:
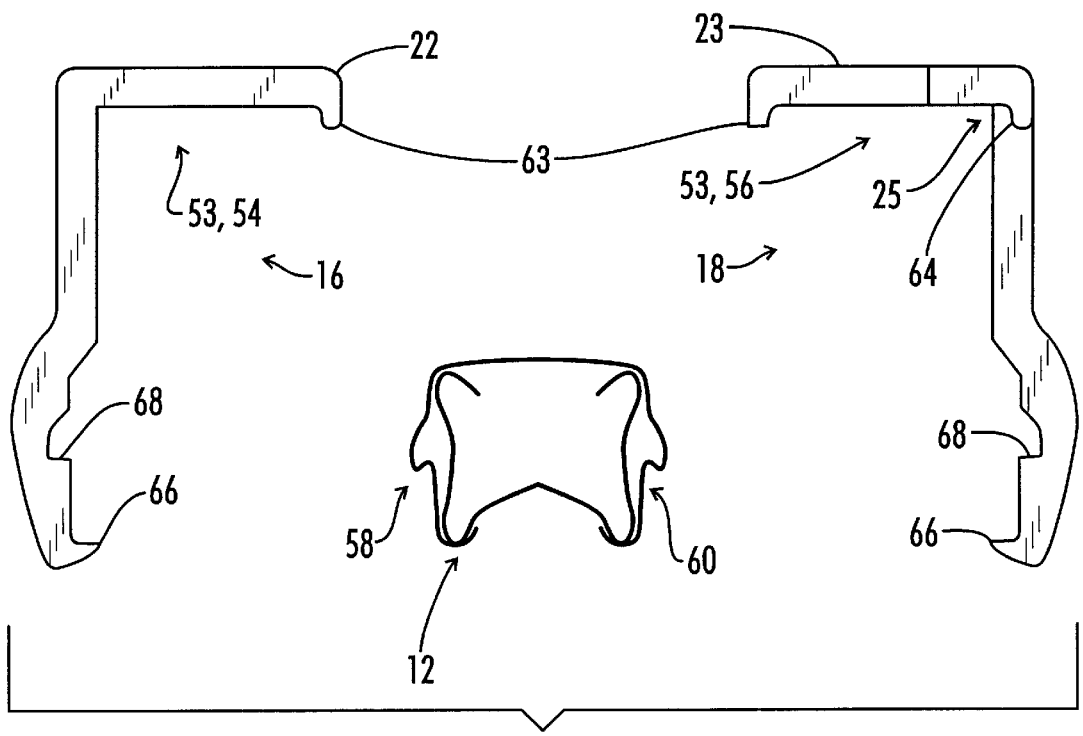
FIG. 5 shows a front view of the assembly separated from the conductive line.

The freedom to easily attach the device 10 at numerous locations along the length of the conductive line 12 is further enhanced by the ability of the device to be assembled around the conductive line 12. As seen in FIG. 5 and 6, the first fastening member 16 can slideably engage the conductive line 12 and slideably engage the second fastening member 18 to retain the conductive line 12 within retaining aperture 20. With the design of the device 10, a user can attach the device 10 to the conductive line 12 by simply sliding the first fastening member 16 and the second fastening member 18 into engagement with the conductive line 12.

Also, the assembly 10 can retain a conductive line 12 in virtually any plane. This allows great freedom by the user of the device 10 to locate the conductive line 12 near numerous different supports 14. For example, the support 14 can be any structure to which a user of the device 10 wishes to attach the conductive line 12, including, but not limited to, walls, posts, equipment, machines, and the like.

The locking element 26 can be any mounting devices known in the art to removably attach the device 10 to a support 14. In a preferred embodiment, the locking element 26 comprises a bolt 28, a locked washer 32, and a nut 34.

When the device 10 is assembled, the head 36 of the bolt 28 engages internal portions 38 of the first interlocking member 16 and the second interlocking member 18. The design of the assembly 10 allows internal portions 38 on interlocking members 16 and 18 to engage the head 36 of the bolt 28 to restrict the bolt 28 from rotating as the locking element 26 is attached to the assembly 10. This engagement restricts the bolt 28 from rotating while the lock washer 32 and nut 34 are tightened on bolt 28. Therefore, the engagement between the head 36 of the bolt 28 and the internal portions 38 of interlocking members 16 and 18 allows the locking element 26 to be secured to the assembly 10 and the support 14 without a need for additional tools to hold the head 36 of bolt 28.

The first connection arm 22 and the second connection arm 23 are shaped so that when a user of the device 10 assembles the device 10 a securing aperture 62 is defined. The securing aperture 62 engages locking element 26 when locking element 26 is used to attach the assembly 10 to a support 14. The securing aperture 62, circular in shape, is designed to conform to the shape of the locking member 26 and to provide a location for the locking member 26 to attach the device 10 to the support 14. Also, the design of the securing aperture 62 allows a slideable connection between the first interlocking member 16, second interlocking member 18, and the locking element 26.

The first receiving portion 24 and the second receiving portion 25 include engagement channels 64 designed to removably engage the first connection arm 22 and the second connection arm 23 respectively. The connection arms 22 and 23 include engagement extensions 63. The engagement channels 64 conform to the shape of the engagement extensions 63 and provide additional securement when the interlocking members 16 and 18 are attached.

The assembly 10 further comprises a securing element 40 removably engaging the first interlocking member 16 and the second interlocking member 18. Once assembled, the securing element 40 removably attaches the first interlocking member 16 to a second interlocking member 18. Also, the securing element 40 repositions the first interlocking member 16 and the second interlocking member 18 to spatially confine the conductive line 12. The securing element 40 effectively clamps the first interlocking member 16 and the second interlocking member 18 around the conductive line 12. This allows the first interlocking member 16 and a second interlocking member 18 to retain the conductive line 12.

The securing element 40 can be any device known in the art to removably attach two sections of a device 10. In a preferred embodiment, securing element 40 comprises a bolt 42, a spacer 44, a lock washer 46, and a nut 48. When the assembly 10 is combined, the bolt 42 traverses opening 50 in the first interlocking member 16, passes through spacer 44 and traverses opening 52 the in second interlocking member 18. Then lock washer 46 and nut 48 are attached to bolt 42 and tightened. Spacer 44 maintains a predetermined width between the internal portion 38 of the first interlocking member 16 and internal portion 38 of the second interlocking member 18. Spacer 44 also restricts the securing element 40 from being tightened too severely thereby causing the first interlocking member 16 and the second interlocking member 18 to apply too much pressure on the conductive line 12 and damage the conductive line 12.

The assembly 10 is also known as a device 10 for attaching a high current conductive line 12 a support 14. The device 10 comprises a first fastening member 16, also known as a first interlocking member 16, a second fastening member 18, also know as a second interlocking member 18, a securing element 40 and a locking element 26. The first fastening member 16 is shaped to receive the conductive line 12 and includes a first attachment section 54. The second fastening member 18 is shaped to receive the conductive line 12 and includes a second attachment section 56 removably engaging the first attachment section 54.

Figure 7:
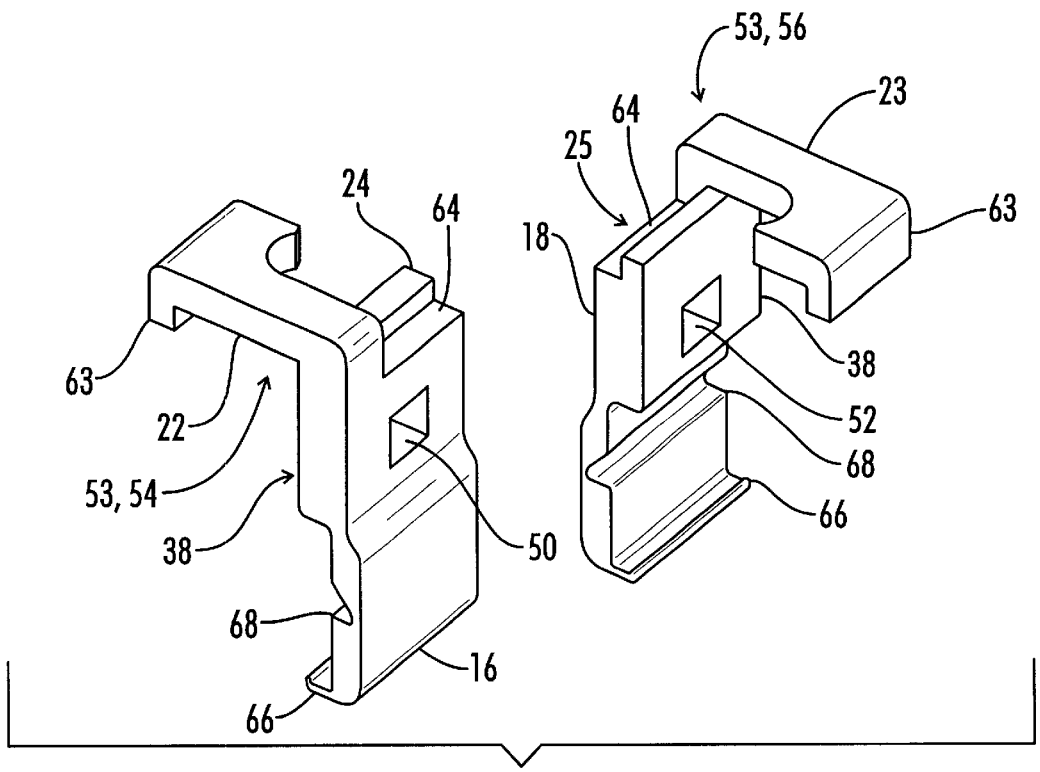
FIG. 7 is a perspective view of the assembly with the two symmetrical sections of the assembly separated.
Figure 8:
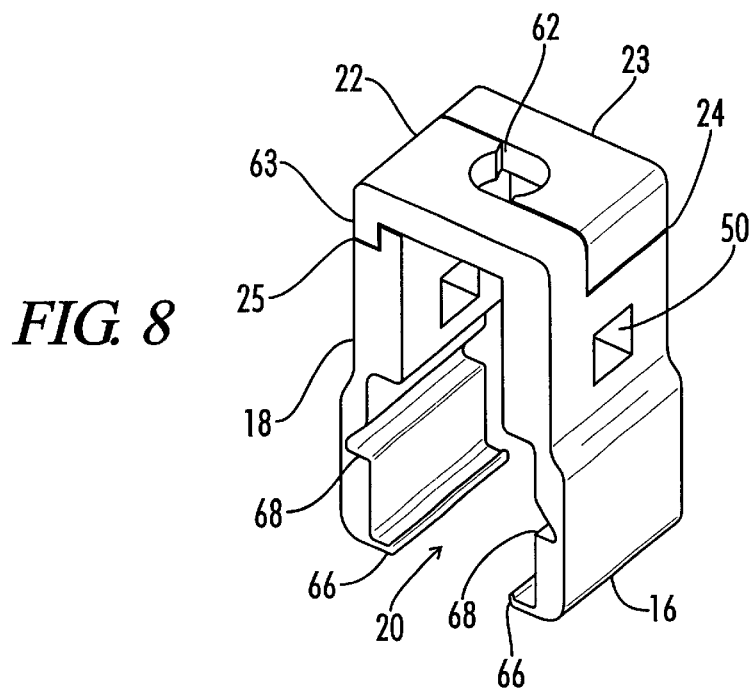
FIG. 8 is a perspective view of the assembly showing the two symmetrical sections of the assembly slideably engaged to each other.

The first attachment section 54 includes a first connection arm 22 and a first receiving portion 24. The second attachment section 56 includes a second connection arm 23 and a second receiving portion 25. When the device 10 is assembled, the first attachment section 54 removably engages the second attachment section 56. During this attachment, the first receiving portion 24 on the first attachment section 54 removably engages the second connection arm 23 on the second attachment section 56. Concurrently, the second receiving portion 25 on the second attachment section 56 removably engages the first connection arm 22 on the first attachment section 54, as illustrated in FIGS. 7 and 8.

The securing element 40 removably engages the first fastening member 16 and second fastening member 18 and positions the first fastening member 16 and second fastening member 18 to support the high current conductive line 12. The securing element 40 also positions the first fastening member 16 and the second fastening member 18 to spatially confine the bus bar 12. The spatial restriction by the first fastening member 16 and the second fastening member 18 provides a frictional engagement between the device 10 and the bus bar 12 so that the device 10 secures the bus bar 12 to the support 14.

The assembly 10 can also be called a device 10 for attaching a support 14 to high current conductive line a 12, also known as a bus bar 12, having a first side 58 and second side 60. The device 10 comprises a first fastening member 16 and a second fastening member 18, where at least one of the first and second fastening members 16 and 18 include an attachment section 53 to attach the device 10 to support 14. The first fastening member 16 is shaped to engage the first side 58 of the bus bar 12. The second fastening member 18 is shaped to engage the second side 60 of the bus bar 12 and adapted to engage the first fastening member 16. Engagement between the first fastening member 16, the second fastening member 18, and the bus bar 12 attaches the bus bar 12 to the support 14.

The assembly 10 can also be called a dye cast aluminum anchor hanger 10. The first interlocking member 16 and the second interlocking member 18 can be described as two halves, 16 and 18 of the anchor 10. These halves 16 and 18 are identical halves designed to fit together in a ying-yang configuration using standard and empirical hardware.

When assembled, these halves 16 and 18 form a retention aperture 20 that engages the conductive line 12. The retention aperture 20 fits around the bus bar 12 to secure and retain the bus bar 12. Also, these halves 16 and 18 fit together around the locking element 26, which can also be described as the mounting hardware 26. The two halves 16 and 18 capture the mounting hardware 26 in securing aperture 62. The securing element 40 uses the two halves 16 and 18 to supply sufficient frictional restriction on the conductive line 12 to satisfactorily reduce thermal expansion and restrict movement of the conductive line 12.

A method for supporting an electrically conducted bus bar 12 is also disclosed. The method comprises removably attaching a first fastening member 16 to a second fastening member 18 and spatially confining the bus bar 12 between the fastening members 16 and 18 to support the bus bar 12.

The method further includes attaching the fastening members 16 and 18 to a support 14 and securing the fastening members 16 and 18 together with a securing element 40.

Thus, it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art, which changes are encompassed within the scope and spirit of the present invention as defined by the appended claims.

What is claimed is:

1. An assembly for attaching a high current conductive line to a support, comprising:

a first interlocking member shaped to receive the conductive line;

a second interlocking member removably attached to the first interlocking member and shaped to receive the conductive line, whereby engagement between the first interlocking member and the second interlocking member defines a retaining aperture shaped to retain the conductive line; and wherein the first interlocking member and second interlocking member are positioned to spatially confine the conductive line.

2. The assembly of claim 1, wherein:

the first interlocking member includes at least one connection arm; and the second interlocking member includes at least one receiving portion shaped to accept the connection arm, wherein engagement between the connection arm and the receiving portion removably engages the first interlocking member to the second interlocking member.

3. The assembly of claim 2, further comprising a locking element engaging the connection arm and removably attaching the first interlocking member to the second interlocking member.

4. The assembly of claim 1, further comprising a locking element removably engaging the first interlocking member, second interlocking member, and the support, the locking element removably attaching the first interlocking member and the second interlocking member to the support.

5. The assembly of claim 1, further comprising a securing element removably engaging the first interlocking member and the second interlocking member, the securing element removably attaching the first interlocking member to the second interlocking member.

6. The assembly of claim 5, wherein the securing element repositions the first interlocking member and the second interlocking member to spatially confine the conductive line.

7. A device for attaching a support to a high current conductive bus bar having a first side and a second side, the device comprising:

a first fastening member shaped to engage the first side of the bus bar;

a second fastening member shaped to engage the second side of the bus bar and adapted to engage the first fastening member to retain the bus bar;

a least one of the first and second fastening members including an attachment section to attach the device to the support; and wherein the first fastening member engages the bus bar and slideably engages the second fastening member to retain the bus bar.

8. The device of claim 7, further comprising a securing element engaging the first fastening member and the second fastening member, wherein the securing element positions the first fastening member and second fastening member to support the bus bar.

9. The device of claim 8, wherein the securing element positions the first fastening member and second fastening member to spatially confine the bus bar.

10. The device of claim 7, wherein:

the first fastening member includes a first connection arm and a first receiving portion;

the second fastening member includes a second connection arm and a second receiving portion;

wherein the first connection arm removably engages the second receiving portion and the second connection arm removably engages the first receiving portion to removably attach the first fastening member to the second fastening member.

11. A device for attaching a high current conductive line to a support, comprising:

a first fastening member shaped to receive the conductive line and including a first attachment section;

a second fastening member shaped to receive the conductive line and including a second attachment section removably engaging the first attachment section;

a securing element removably engaging the first fastening member and the second fastening member and positioning the first fastening member and the second fastening member to support the high current conductive line; and a locking element removably engaging the first fastening member, the second fastening member and the support.

12. An assembly for attaching a high current bus bar to a support, comprising:

a first interlocking member shaped to receive the bus bar and including a first protrusion and a first receiving portion;

a second interlocking member shaped to receive the bus bar and including a second protrusion and a second receiving portion;

a securing element engaging the first interlocking member and the second interlocking member, wherein the securing element positions the first interlocking member and the second interlocking member to support the bus bar; and wherein the first protrusion removably engages the second receiving portion and the second protrusion removably engages the first receiving portion to removably attach the first interlocking member to the second interlocking member and create a retaining aperture shaped to retain the bus bar.

13. A method for supporting an electrically conductive bus bar, comprising:

a) removably attaching a first fastening member to a second fastening member; and b) spatially confining the bus bar between the fastening members to support the bus bar.

14. The method of claim 13, wherein step b) further includes attaching the fastening members to a support.

15. The method of claim 13, wherein step a) further includes securing the fastening members together with a securing element.

* * * * *